United States Patent [19]

Lasley

[11] Patent Number: 4,990,726
[45] Date of Patent: Feb. 5, 1991

[54] DIGITIZED CONTROLLER FOR POSITION LOCATOR

[75] Inventor: Daniel G. Lasley, Newtown, Conn.

[73] Assignee: Summagraphics Corporation, Seymour, Conn.

[21] Appl. No.: 432,798

[22] Filed: Nov. 7, 1989

[51] Int. Cl.⁵ .............................. G08C 21/00
[52] U.S. Cl. ............................................ 178/19
[58] Field of Search ............................ 178/18, 19

[56] References Cited

U.S. PATENT DOCUMENTS

| | | | |
|---|---|---|---|
| 3,873,770 | 3/1975 | Ioannou | 340/347 |
| 3,904,822 | 9/1975 | Kamm et al. | 340/347 |
| 4,368,351 | 1/1983 | Zimmer | 178/18 |
| 4,455,451 | 6/1984 | Kriz | 178/18 |
| 4,820,886 | 4/1989 | Watson | 178/19 |

Primary Examiner—Stafford D. Schreyer
Attorney, Agent, or Firm—Rosen, Dainow & Jacobs

[57] ABSTRACT

A digitizer tablet uses sequenced wire addressing to derive time-related voltages correlated to the location of the addressed wires. The voltages are digitized, and an algorithm followed to determine by interpolation the exact position of a pointing device over the addressed wires. The algorithm employs a calculation based on determining the X-intercept of a straight line.

9 Claims, 3 Drawing Sheets

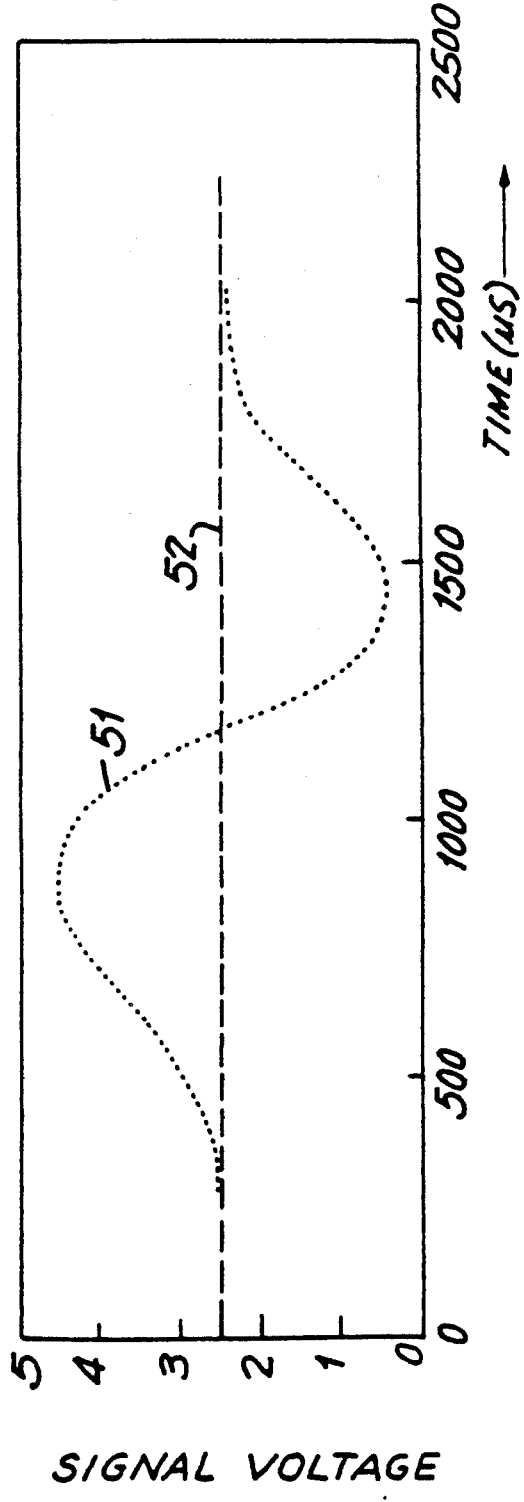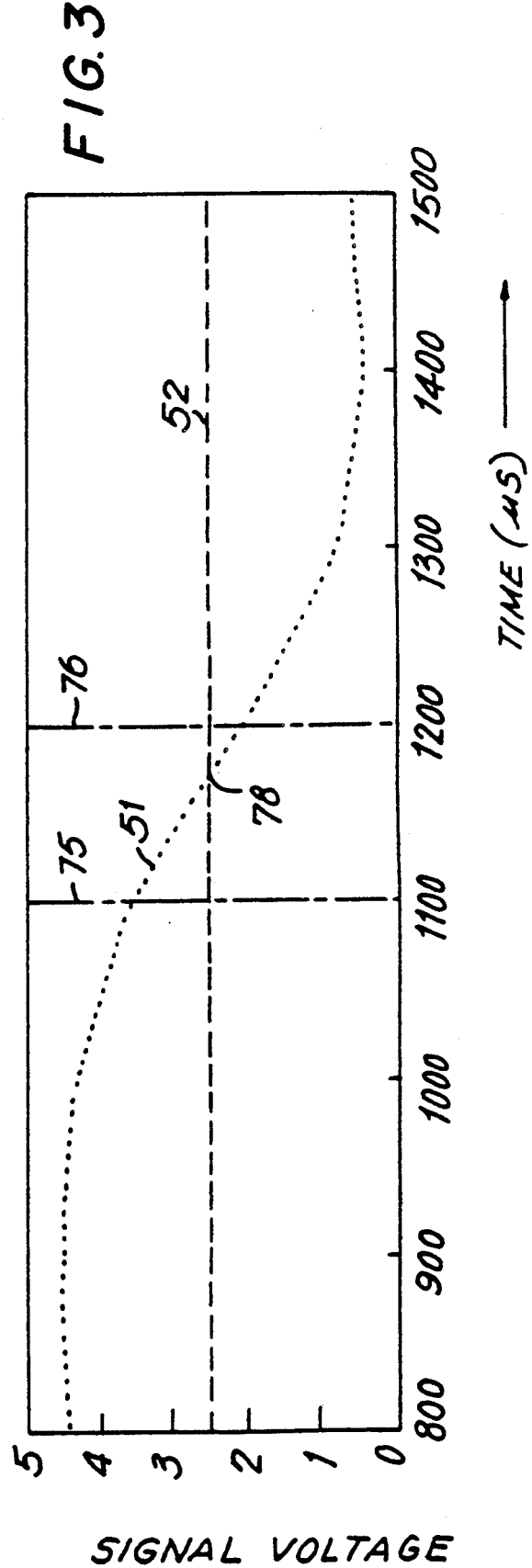

4,990,726

DIGITIZED CONTROLLER FOR POSITION LOCATOR

This invention relates to digitizer tablets for locating the position of a pointing device over a grid structure.

BACKGROUND OF THE INVENTION

Digitizer tablets are well known in the art. In one popular type, the pointing device comprises a coil in a cursor or stylus configuration which is positioned by a user over a tablet surface in which is embedded a wire grid extending in two coordinate directions. In one mode, the pointing device coil is energized to electromagnetically induce signals in the grid wires. In another mode, the grid wires are energized to electromagnetically induce signals in the pointing device coil. In both modes, the grid wires are sequentially addressed, either one at a time or in groups, to provide an output analog voltage in timed relation to the grid addressing. The output voltage with increasing time reaches a maximum, passes through zero, and then reaches a minimum in the vicinity of the pointing device coil. When addressing begins, a high frequency counter is activated to interpolate between the particular grid lines addressed. A stop signal for the counter is generated when the zero crossover is determined. The count value determines the location of the pointing device between the two closest grid wires. Examples of patents describing in more detail this type of digitizer are Kamm et al No. 3,904,822; Ioanau No. 3,873,770; and Zimmer No. 4,368,351.

In many of the known systems, analog processing of the output signals is performed. Typically, the output signal is phase displaced with respect to a reference signal which energizes the grid or coil, and the phase displacement is detected and converted to a polarity reversal as the scanned grid wires pass under the pointing device coil in order to more accurately locate the zero crossing point. The resolution of this system is limited by the speed of the counter and the grid spacing.

The trend in the art is to reduce the cost and complexity of digitizer tablets while retaining the same accuracy and resolution, or to increase accuracy and resolution without increasing cost. This has led to an increasing use of digital signal processing circuits. Moreover, with digital signal processing, it becomes easier to add new features to improve user performance or to expand tablet applications.

SUMMARY OF INVENTION

An object of the invention is an improved digitizer table with enhanced digital signal processing.

Another object of the invention is a digitizer tablet that employs analog/digital (A/D) conversion and processing of the digital signals to determine pointing device location.

A further object of the invention is a digitizer tablet that converts the output analog signals into digital signals and then employs interpolation of the digital signals to accurately locate the position of a pointing device.

These and other object and advantages of the invention as will appear hereinafter are achieved by first determining an induced voltage reference value with no signal present, and converting the reference value to a digital count. Next, a sequence of voltage measurements are made by scanning the grid wires, the induced voltages determined, and likewise converted into digital count. Next, certain of these digital count values are identified and used to calculate a certain zero-crossing point count. The zero-crossing point count is then readily converted into the desired X or Y coordinate.

SUMMARY OF DRAWINGS

The invention will now be described with reference to the accompanying drawings wherein:

FIG. 2 is a graph showing how signal voltages derived from the grid array of FIG. 1 vary as a function of time;

FIG. 3 is an expanded version of FIG. 2 over a smaller range of time;

DETAILED DESCRIPTION OF PREFERRED EMBODIMENTS

Reference is made to the above-referenced patents for a more detailed description of tablet constructions and their operation. Most of the details are unnecessary for a understanding of the present invention. Thus, it is not important to the present invention how the grid wires are laid out or scanned, whether individually or in group, nor is it important how the analog voltages are amplified or associated with a particular grid wire as this is all well-known in the art. Moreover, it doesn't matter whether the grid is energized and the output taken from the pointing device coil, or vice-versa. The present description will thus focus on how the analog output voltages are converted into digital count values which are then processed to determine pointing device location. For this purpose, a particular tablet construction, typical of commercial units, will be assumed and the invention explained in the context of that assumed tablet, but it will be understood that the invention is not limited in its application to that assumed construction but is generally applicable to any digitizer tablet wherein a sequence of time-related induced voltages are correlated to grid wire locations in the process of locating a pointing device with respect to those grid wires. Moreover, the assumed embodiment will illustrate the invention applied to determining pointing device position with respect to one coordinate of a typical X-Y coordinate system, but it will be understood that a similar grid array will exist for the other of the two coordinate axis system and the successive scanning of the second grid will generate the coordinate position for that second coordinate axis, which again is typical of known digitizer tablets.

Figure 1:
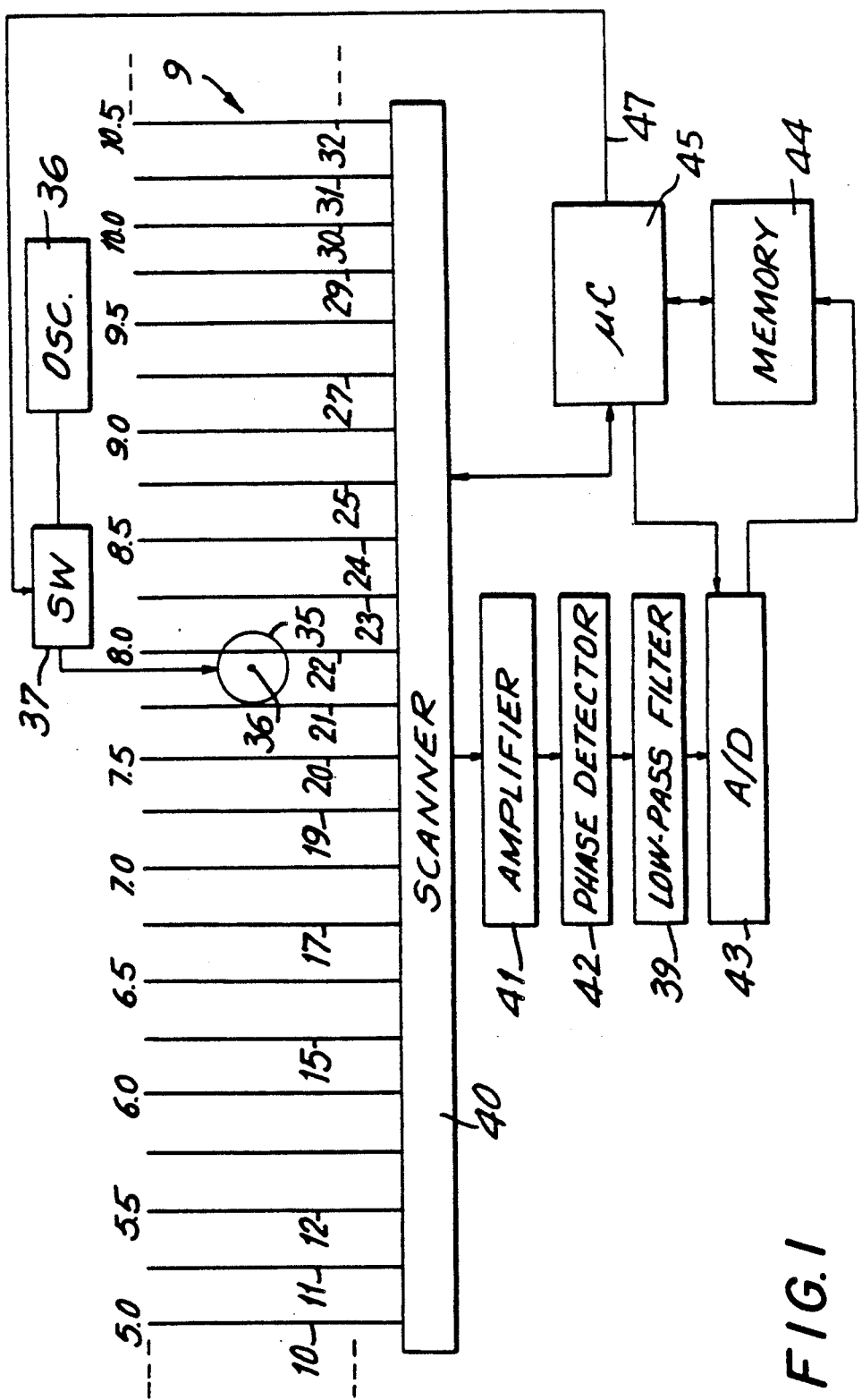
FIG. 1 is a schematic layout of the grid array for one coordinate axis of a digitizer tablet according to the invention, also showing a block diagram of the signal processing circuitry.

FIG. 1 illustrates, schematically, the grid layout 9 of a portion of a tablet. The grid wires 10–32 extend in, say, the Y direction and are used to determine X-coordinate positions. The grid wire locations with respect to the origin is indicated by the series of numbers at the top of the figure. Thus, wire 10 is located 5.0 inches from the origin, wire 11 at 5.25 inches, wire 12 at 5.5 inches, and so on. Note that the wires are spaced 0.25 inches apart in this example. A pointing device coil 35 is indicated by the circle, with its electrical center by numeral 36. The object is to locate the center 36 with respect to the grid array 9. In this exemplary embodiment, the tablet is pointing device driven by connecting the coil 35 to an oscillator 36 via a switch 37. The sequential scanning of the grid wires is carried out by a conventional scanner 40, and any voltages induced in a grid wire are amplified in a conventional amplifier 41, detected in a synchronous phase detector 42, filtered in a low-pass filter 39, and then processed through a conventional A/D converter 43. The digital outputs are then stored in memory 44. All this is done under the control of a microcontroller (uC) 45.

In a typical operation, the scanner 40 connects each grid wire in turn to the amplifier 41 every, say, 100 uS. The induced voltage in that grid wire is derived, amplified, filtered, converted into a digital count and stored in successive memory locations in memory 44. The uC 45 is connected via line 47 to the switch 37 to turn the latter off during an initialization phase, so that a reference digital count can be determined without the coil 35 being energized and thus without a signal being induced in the wires. Later on during the processing, the switch is turned back on.

As is well-known, the number of levels into which an analog signal can be digitized is determined by the number of binary bits allocated for the digitization process. Thus, an 8-bit A/D converter can convert the analog signal into one of 256 possible values, whereas a 10-bit A/D converter can convert into one of 1024 possible values. While the invention is not limited thereto, I prefer to use a 10-bit A/D converter 42 to increase resolution, and the values given below are based upon the use of such a converter.

FIG. 2 is a graph of the voltage output from the grid wires and from the phase detector 42 which is input to the A/D convertor 43, as a function of time in uS. The state of affairs indicated in FIG. 1 is assumed, with coil center 36 somewhere between the wires 21 and 22. The dotted line curve 51 represents the signal voltage output at various points in time during the processing from the phase detector 42 which is input to the A/D converter 43. The horizontal dashed line 52 represents a reference value, determined as explained below.

The data obtained from a typical scan routine for the assumed tablet configuration is depicted below in table I. There are five columns. The first column is the wire sequence scan time in uS, ranging from 0 for wire 10 to 2200 for wire 32. The second column indicates the corresponding location in inches from the origin of the succession of wires, ranging from 5.0 inches for wire 10 to 10.5 inches for wire 32 in 0.25 inches increments. The third column labelled A/D INPUT is the signal voltage in volts at the input to the A/D converter, represented by curve 51 in FIG. 2. The fourth column labelled COUNTS is the digitized voltage in the range of 0-1024, for the assumed 10-bit A/D converter, which count values are then stored in memory 44. The fifth column is a remarks column for reference in the explanation given below.

TABLE I

| TIME (uS) | GRID LOCATION | A/D INPUT | COUNTS | REMARKS |
|---|---|---|---|---|
| 0 | 5.000 | 2.50 | 512 | REF |
| 100 | 5.250 | 2.51 | 513 | REF |
| 200 | 5.500 | 2.48 | 507 | REF |
| 300 | 5.750 | 2.55 | 522 | |
| 400 | 6.000 | 2.63 | 538 | |
| 500 | 6.250 | 3.00 | 614 | PROX |
| 600 | 6.500 | 3.40 | 696 | |
| 700 | 6.750 | 4.00 | 819 | |
| 800 | 7.000 | 4.45 | 911 | |
| 900 | 7.250 | 4.55 | 932 | MAX |

TABLE I-continued

| TIME (uS) | GRID LOCATION | A/D INPUT | COUNTS | REMARKS |
|---|---|---|---|---|
| 1000 | 7.500 | 4.25 | 870 | |
| 1100 | 7.750 | 3.50 | 717 | P1 > REF |
| 1200 | 8.000 | 2.00 | 411 | P2 < REF |
| 1300 | 8.250 | 0.80 | 164 | |
| 1400 | 8.500 | 0.45 | 92 | MIN |
| 1500 | 8.750 | 0.55 | 113 | |
| 1600 | 9.000 | 1.05 | 215 | |
| 1700 | 9.250 | 1.75 | 358 | |
| 1800 | 9.500 | 2.25 | 461 | |
| 1900 | 9.750 | 2.40 | 492 | |
| 2000 | 10.000 | 2.48 | 507 | |
| 2100 | 10.250 | 2.50 | 512 | |
| 2200 | 10.500 | 2.50 | 512 | |

FIG. 3 is an expanded version of the curves of FIG. 2 over the range of 800-1500 uS, corresponding to wires 18-25.

The manner in which the thus obtained information is processed to precisely determine the position of the coil center 36 with respect to the shown grid array is as follows. Essentially a sequence of steps are carried out under the control of the uC 45 by appropriate programming. The basic algorithm employed is as follows:

1. Determine the reference level count, REF, 52 (FIG. 2) with no energizing signal present. Several samples can be obtained and averaged to reduce the effect of noise.

2. Energize the tablet and scan until a count exceeding a threshold count, PROX, is obtained. This is to ensure that the pointing device is closer to the grid than a so-called proximity threshold, a specified characteristic of all tablets. In many tablets, coordinates are not generated unless the pointing device is in proximity (PROX) and not out of proximity (OUT-OF-PROX). This is obtained by adding to the reference value count an arbitrary increment N. For the assumed tablet, N is made equal to 100. Thus, $PROX = REF + 100$.

3. Determine a maximum recorded count which must exceed PROX.

4. Determine intermediate count values below the maximum count. As will be observed from FIG. 2, the signal voltage peaks, corresponding to a maximum, and then the curve 51 falls toward zero. The corresponding intermediate count values needed lie along the negative slope of that curve 51 after the maximum value has been passed. Hence, the scanning is continued until a sequence of counts is obtained in which the second count, following a previous first count representing MAX, is smaller than the first count, and a next third count following the second count is smaller than the second count. The second and third counts if respectively above and below REF are the intermediate values used in the interpolation. An alternative method is to calculate the slope of the count values corresponding to curve 51 and determine then that the peak has been passed when the slope becomes negative.

5. Using the intermediate values determined in step 4, interpolate between those values by calculating the X-intercept (REF level crossing) of a straight line curve formed by the intermediate count values. That intercept or crossing represents the precise location of the coil center 36 over the grid array.

Figure 4:
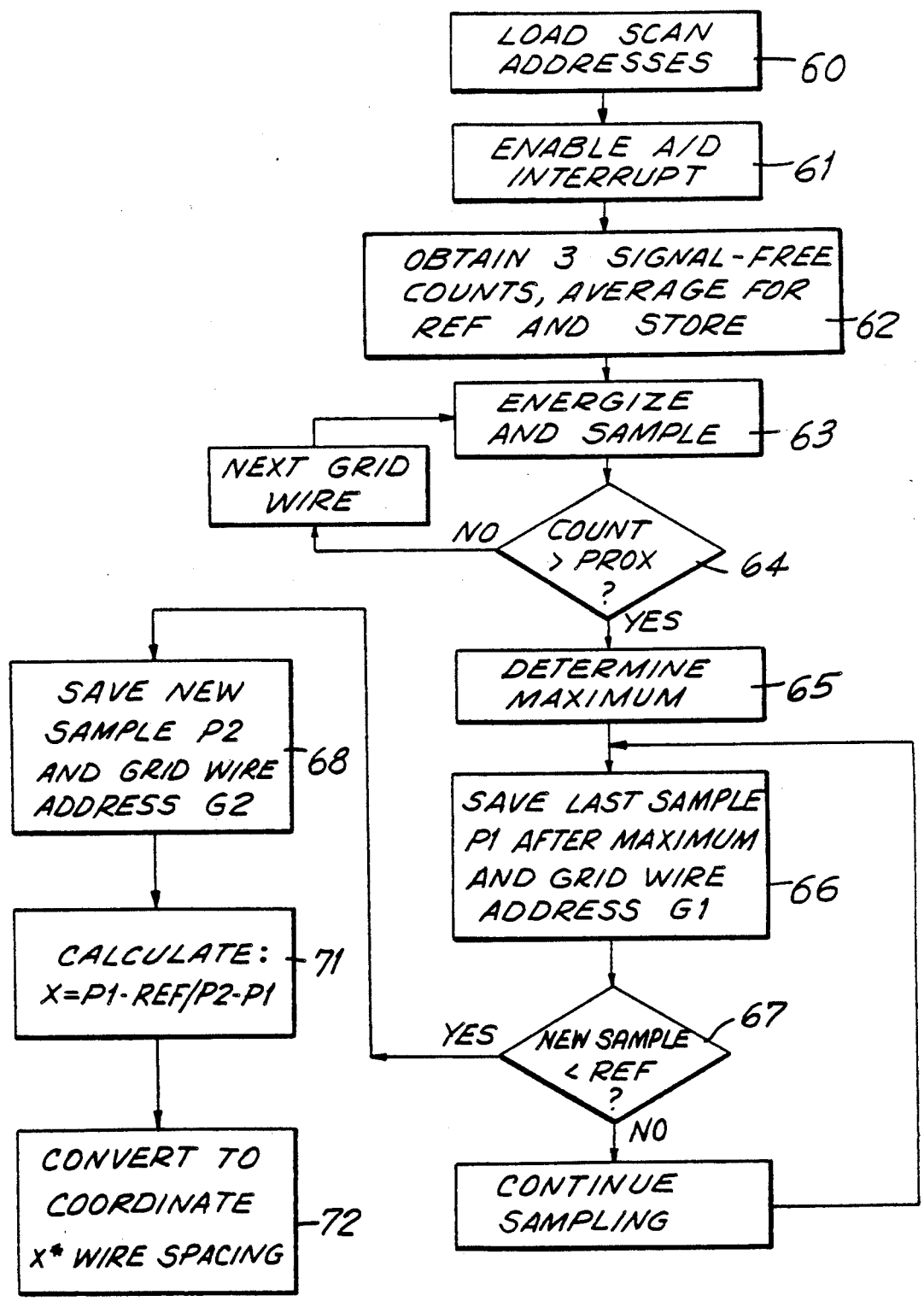
FIG. 4 is a flow chart of the processing of the signal information to determine coordinate location of a pointing device with respect to a tablet.

A detailed description will now be given with reference to Table I and the flow chart of FIG. 4. The grid start and stop addresses are loaded by the uC 45 into the scanner circuit 40, shown at 60 in FIG. 4. The program then enables the A/D conversion interrupt 61 for each scan interval, in this case for every 100 uS. The significance of this derives from the need to achieve high accuracy. In the described system, the physical layout of the wires and their spacing is a constant. To obtain accurate interpolation, the electronics also must be maintained collection must be timing independent, which is analogous to the requirements for a real-time system wherein input from a port is being received and analyzed as quickly as possible and without interruption. A typical microprocessor (uP) or uC of the type conventionally used in tablets is interrupt driven. This means that the processor will stop what it is doing whenever interrupted, process the interrupt, and then continue with the previous process. If such a uP or uC were employed in the present invention, certain inaccuracies would result due to the fact that the analog voltage waveform is not being sampled and digitized at the same precise intervals. While such inaccuracies may be acceptable for a low-performance tablet, I prefer to employ in the system of the invention a uP or uC whose interrupts can be controlled to ensure priority processing of the sampling of the collected data and its conversion into digital values. By exercising such control, the outputted digital values become timing independent. There are a number of uPs and uCs that provide this feature known as a programmable event coordinator. A preferred uC is any of the INTEL 8096 family, which includes a high-speed I/0 module, and which is hardware independent of the uC. The program step indicated by block 61 sets the uC to conduct an A/D conversion of the input analog waveform every 100 uS without interruption for any other task. While in FIG. 1 the A/D converter 43 and memory 44 are shown separately from the uC 45, for the 8097 part, both the A/D converter and the memory are actually incorporated in a single 8097 chip.

The next step, block 62, is to determine the REF value. This is done without any signal being present. One way of obtaining a good REF value is to obtain three samples with the grid not driven and then average the three values. This is indicated in the first three rows in Table I. The three REF counts indicated to find their average and stores this average REF value. In the example illustrated, average REF=511.

Next, the grid is driven and scanned and sampled in block 63 until the count exceeds the assumed PROX value, which in this case equals REF +N, an arbitrary number which is chosen to be equal to 100. Thus PROX=511+100=611 and is stored. In block 64, the scanned sampled count is compared against PROX. If less than PROX, the grid address is incremented and a new sample obtained. As will be observed from Table I, at the 500 uS scan time, the recorded count 614 exceeds PROX and control falls through to the next block 65 in the flow chart of FIG. 4. If no sample exceeds the PROX level, it is assumed that the pointer is not near the tablet.

During the previous scans over the wires 10-32, the digitized count values have been stored in memory. The next step is to determine a maximum count by a routine which tests each of the recorded counts until a maximum is identified. From the data in Table I, this occurs at the grid wire 19, location 7.25. When the maximum is identified, then the count values must begin to decrease. As indicated by block 66 of the flow chart, the next count value after the decrease begins at location 7.5 (wire 20) and if greater than REF is saved as P1 and its grid wire location as G1. Thus, from Table I, P1 becomes equal to 717 and G1 to 7.75. REF is then compared 67 to the next sample at location 8.0. If this next sample is less than REF, it is saved as P2 and its location as G2, shown at block 68. If the next sample is not less than REF, then sampling is continued 69 until two count values P1 and P2 are determined along the negative slope of curve 51 which bracket REF 52. The purpose of this procedure is to define the portion of the output curve 51 shown in FIG. 3 which crosses the REF axis 52. Experience has shown that this portion nearly a straight line. This makes calculation of the zero crossing relatively simple.

The next step shown in block 71 is to calculate the zero crossing by interpolating between P1,G1 and P2,G2. To calculate the zero crossing as a percentage of the grid spacing (0.25 inches for the example given), we assume $G1=0$, and $G2-G1=1$, and thus the calculation for the line between P2 and P1 becomes:

$$y = mX + b.$$

where X is the zero-crossing, and thus $$P_n = mG_n + b$$

(where the subscript n represents P and G for an arbitrary wire).

Simplifying, $G1=0$, therefore $b=P1-REF$; and $G2-G1=1$, therefore $m=P2-P1$. Solving for X as a percentage of grid spacing with the Y intercept equal to REF reduces to:

$$G0 = -b/m = (P1-REF)/(P2-P1),$$

and converting this to a coordinate in block 72 gives the X coordinate of the coil center 36 as $X = (G1+G0) * 0.250$. For the specific example, $G1=7.75$, $G0=(717-511)/(411-717)$. For these values, $m=-306$, $b=206$, the interpolation as a percentage $=0.6732\%$, and in inches becomes 0.1683. Thus, X becomes equal to $7.75+0.1683=7.9183$.

A visual comparison of FIG. 3 illustrates the accuracy of the interpolation. The vertical line 75 represents wire 21 at location 7.75 inches (G1). The vertical line 76 represents wire 22 at location 8.0 inches (G2). The horizontal line 52 represents the reference axis. The point 78 is the desired zero crossing, which is about 67% of the spacing from line 75 to line 76, resulting in the coordinate position of 7.9183. The expected accuracy is at least as good as current tablets but using much less circuitry and thus fewer parts and lower cost. This accuracy depends on the validity of the assumption that the portion of the analog curve in the immediate vicinity of the zero crossing is nearly a straight line, and that straight line is calculated using sampled values that bracket the crossing.

The invention is not limited to calculating the zero crossing using the straight line formula $y=mx+b$. Other ways are known in the art for calculating the X intercept of a straight line or of a curve and can be substituted if desired. As mentioned above, accuracy is also dependent upon accurate sampling of fixed intervals of the analog voltage using circuitry which is timing independent. Non-uniform delays in the data collection will affect the digitized count values stored and the accuracy of the result. This will void the assumption of equal spacing between samples (G2−G1 =1). Use of a timing independent uC such as the 8097 avoids this problem. In principle, it is also possible to hardwire the data collection to eliminate timing problems, or use any of the other concepts well known in the development of real-time systems to ensure optimum collection and processing of the data without undue variations.

As mentioned earlier, the invention as described with the assumed tablet construction determines the X-coordinate position of the pointing device coil center. In most practical embodiments, a similar array of grid wires would be provided for determining the Y-coordinate position, and the algorithm described would be repeated with values obtained when the Y-determining array is energized.

While the invention has been described and illustrated in connection with preferred embodiments, many variations and modifications as will be evident to those skilled in this art may be made therein without departing from the spirit of the invention, and the invention as set forth in the appended claims is thus not to be limited to the precise details of construction set forth above as such variations and modifications are intended to be included within the scope of the appended claims.

What is claimed is:

1. In a digitizer tablet comprising an array of grid wires, a pointing device whose position is to be located with respect to the array, means for energizing the grid wires or pointing device, and means for addressing the wires in a sequence thereby deriving from the wires and pointing device time-related induced analog voltages correlated to grid wire locations, the improvement comprising:
    (a) means for sampling the analog voltages;
    (b) means for determining a pair of sampled values derived from wires located under opposite sides of the pointing device;
    (c) means for interpolating between the pair of sampled values determined in (b) to determine substantially the exact location of the pointing device relative to the array.

2. In a digitizer tablet comprising an array of grid wires, a pointing device whose position is to be located with respect to the array, means for energizing the grid wires or pointing device, and means for addressing the wires in a sequence thereby deriving from the wires and pointing device time-related induced analog voltages correlated to grid wire locations, the improvement comprising:
    (a) means for converting the analog voltages into corresponding digital values,
    (b) means for determining a reference digital level without energization,
    (c) means for determining a pair of intermediate digital values between a maximum value above the reference level and a lower value below the reference level,
    (d) means for interpolating between those intermediate values to determine substantially the exact digital value corresponding to the reference level,
    (e) means for converting the digital value determined in (d) into a coordinate position along the array of the pointing device.

3. The digitizer tablet of claim 2, wherein the interpolation means calculates the X-intercept of a straight line defined by the said two intermediate digital values.

4. A method of determining the location along one coordinate axis of a pointing device over an array of grid wires in a digitizer tablet, comprising the steps:
    (a) scanning the wires in an addressing sequence to produce analog voltages which are time-related and correlated to each scanned wire and sampling and digitizing the sampled voltages,
    (b) storing at least some of the digitized values of the sampled voltages,
    (c) before energizing the grid array or pointing device, determining a signal-free reference level from the stored values,
    (d) energizing the grid array or pointing device,
    (e) continuing to sample, convert and store values until a first value is obtained that exceeds the reference level,
    (f) determining from the values stored in step (e) second and third values that are less than the first value and that respectively are greater than and less than the reference value and that are later in time than the first value,
    (g) calculating the location of where a line drawn between the second and third values is substantially equal to the reference level.

5. The method of claim 4 wherein step (e) is carried out by establishing a fourth value that is equal to the reference level plus a fixed increment and determining the first value when the digitized sample exceeds the fourth value.

6. The method of claim 4, wherein, after determining the first value in step (e), in step (f) testing the later digitized values and if smaller than the first value storing it as the second value and also the location of the grid wire from which it was derived, then testing the later digitized values for a value that is less than the reference level and storing it as the third value, and carrying out step (g) using the second and third values to determine a straight line.

7. The method of claim 6, wherein the calculation uses the formula $y=mX+b$ to calculate the X-intercept.

8. The method of claim 7 wherein the location determined in step (g) is added to the location of the grid wire from which the second value was derived to determine the exact location of the pointing device.

9. The method of claim 4 wherein a processing unit is employed that is time independent.

* * * * *

UNITED STATES PATENT AND TRADEMARK OFFICE
CERTIFICATE OF CORRECTION

PATENT NO. : 4,990,726

DATED : February 5, 1991

INVENTOR(S) : Daniel G. Lasley

It is certified that error appears in the above-identified patent and that said Letters Patent is hereby corrected as shown below:

Column 6, line 11, after "portion" insert
--of the curve which has the steepest decline following the peak is--

Signed and Sealed this

Ninth Day of February, 1993

Attest:

STEPHEN G. KUNIN

*Attesting Officer*    Acting Commissioner of Patents and Trademarks